United States Patent [19]

Steiner et al.

[11] Patent Number: 5,064,949

[45] Date of Patent: Nov. 12, 1991

[54] CELLULOSE ESTER MICROPARTICLES AND PROCESS FOR MAKING THE SAME

[75] Inventors: Thomas L. Steiner, Charlotte; Kenneth A. Domeshek, Matthews; William Stitt, Pineville; Jesse L. Riley; Lance J. Deutsch, both of Charlotte, all of N.C.

[73] Assignee: Hoechst Celanese Corporation, Somerville, N.J.

[21] Appl. No.: 709,519

[22] Filed: Jun. 3, 1991

Related U.S. Application Data

[60] Division of Ser. No. 342,275, Apr. 24, 1989, Pat. No. 5,042,180, and a continuation-in-part of Ser. No. 77,274, Jul. 24, 1987, abandoned, and a continuation-in-part of Ser. No. 77,275, Jul. 24, 1987, abandoned, and a continuation-in-part of Ser. No. 281,587, Dec. 9, 1988, abandoned, and a continuation-in-part of Ser. No. 88,914, Aug. 24, 1987, abandoned, and a continuation-in-part of Ser. No. 168,799, Mar. 16, 1988, abandoned.

[51] Int. Cl.$^5$ .................... C08B 3/22; B32B 5/16
[52] U.S. Cl. ........................ 536/56; 536/76; 536/124; 428/402
[58] Field of Search .............. 536/56, 124, 76; 428/402

[56] References Cited

U.S. PATENT DOCUMENTS

| | | | |
|---|---|---|---|
| 1,899,061 | 2/1933 | Silberrad et al. | 536/76 |
| 1,993,782 | 3/1935 | Haney | 536/76 |
| 2,140,543 | 12/1938 | Northrop et al. | 536/76 |
| 2,607,703 | 8/1952 | Resch et al. | 106/196 |
| 2,809,192 | 10/1957 | Sloan et al. | 536/76 |
| 2,895,843 | 7/1959 | Lepin et al. | 106/196 |
| 3,067,463 | 12/1962 | Patton et al. | 425/10 |
| 3,332,937 | 7/1967 | Jori | 536/76 |
| 3,558,507 | 1/1971 | Harbort | 252/316 |
| 3,943,063 | 3/1976 | Morishita et al. | 428/402.24 |
| 3,949,096 | 4/1976 | Johnson et al. | 426/302 |
| 3,981,957 | 9/1976 | van Brederode et al. | 264/12 |
| 4,016,254 | 4/1977 | Seager | 428/402.24 |
| 4,024,334 | 5/1977 | Chandler et al. | 536/76 |
| 4,063,017 | 12/1977 | Tsao et al. | 536/57 |
| 4,090,022 | 5/1978 | Tsao et al. | 536/57 |
| 4,111,684 | 9/1978 | Thomas et al. | 71/DIG. 1 |
| 4,118,336 | 10/1978 | Morishita et al. | 428/402.24 |
| 4,228,276 | 10/1980 | Kuo et al. | 536/76 |
| 4,286,020 | 8/1981 | Himel et al. | 264/4 |
| 4,303,603 | 12/1981 | Torobin | 521/919 |
| 4,312,980 | 1/1982 | Motozato et al. | 536/76 |
| 4,390,691 | 6/1983 | Nishikawa et al. | 536/76 |
| 4,418,026 | 11/1983 | Blackie et al. | 264/8 |
| 4,420,442 | 12/1983 | Sands | 264/14 |
| 4,461,892 | 7/1984 | Nishikawa et al. | 536/76 |
| 4,551,389 | 11/1985 | Ohtake et al. | 536/76 |
| 4,612,247 | 9/1986 | Walsh et al. | 428/402 |
| 4,638,057 | 1/1987 | Takahashi et al. | 536/76 |
| 4,663,447 | 5/1987 | Yamazaki et al. | 536/76 |
| 4,671,909 | 6/1987 | Torobin | 264/43 |
| 4,675,140 | 6/1987 | Sparks et al. | 264/4.3 |

FOREIGN PATENT DOCUMENTS 0135022  7/1984  European Pat. Off. ............ 424/488

Primary Examiner—Nathan M. Nutter
Attorney, Agent, or Firm—Robert H. Hammer, III

[57] ABSTRACT

Cellulose ester microparticles with unique properties are made by a process having the following steps:
  (a) dissolving a cellulose ester in a liquid comprising a solvent for the cellulose ester and a non-solvent for the cellulose ester, thereby forming a dope;
  (b) spheronizing the dope thereby forming fine droplets of the dope;
  (c) dropping the droplets for a finite amount of time; and
  (d) precipitating the droplets in a bath containing a precipitant.

2 Claims, 5 Drawing Sheets

CELLULOSE ESTER MICROPARTICLES AND PROCESS FOR MAKING THE SAME

This is a divisional of copending application Ser. No. 07/342,275 filed on Apr. 24, 1989, and now U.S. Pat. No. 5,047,180 said application is a continuation-in-part of 07/077,274 filed Jul. 24, 1987, now abandoned; a continuation-in-part of 07/077,275 filed Jul. 24, 1987, now abandoned; a continuation-in-part of 07/281,587 filed Dec. 9, 1988, now abandoned; a continuation-in-part of 07/088/914 filed Aug. 24, 1987, now abandoned; a continuation-in-part of 07/168,799 filed Mar. 16, 1988, now abandoned.

FIELD OF THE INVENTION

Cellulose ester microparticles and their manufacturing process are disclosed herein.

Microparticles, generally, and cellulose ester and cellulose microparticles, specifically, and the processes for making each are not new. For example, see U.S. Pat. Nos. 4,090,022; 4,063,017; 4,551,389; 4,663,447; 4,024,334; 4,390,691; and 4,461,892. Each said patent shall be discussed in detail hereinafter.

U.S. Pat. Nos. 4,090,022 and 4,063,017, both to Tsao et al, are directed to cellulose beads made from a cellulose ester precursor. Tsao et al's process requires the following steps: (a) dissolving a cellulose derivative in a "inert organic, water miscible solvent", thereby forming a solution: (b) forming the solution into droplets by spraying and allowing the droplets to fall to a precipitation bath; (c) precipitating the solution in the precipitating bath which consists of water; (d) separating and washing the beads from the bath; and (e) hydrolyzing the beads to cellulose The "inert organic-water miscible solvent" used to dissolve the cellulose derivative is 100% organic solvent (slight amounts of moisture, normally existing in commercial grades of the solvent, are tolerable). Examples of the solvents are set forth in columns 5 and 6 of U.S. Pat. No. 4,090,022. The criticality of the "solvents" composition is set forth in U.S. Pat. No. 4,090,022 at column 4, lines 43–60.

U.S. Pat. Nos. 4,551,389 and 4,663,447, both assigned to Daicel Chemical Industries, Limited of Japan, are directed to porous cellulose acetate microparticles. The process by which these microparticles are made include the steps of: (a) dissolving the cellulose acetate in a solvent of acetic acid and water and thereby forming a dope; (b) forming the microparticles by injecting the dope through a nozzle directly into the coagulation bath where an agitator blade cuts the dope into small particles; (c) coagulating the cut dope in the coagulation bath which consists of water and acetic acid; and (d) separating and washing the microparticles. The solvent for the dope consists of a mixture of acetic acid and water in ratios ranging from 80/20 to 90/10. The coagulation bath consists of a mixture of water and acetic acid in ratios ranging from 70/30 to 58/42. These process steps are critical to the formation of the beads because those steps allow the formation of a tough shell around the droplet early during the coagulation step. Although the beads are porous, their porosity is poor because the immediate coagulation of the skin does not allow the skin to flow and thus the bead is very dense, with a small pore structure at and just below the skin.

U.S. Pat. No. 4,024,334 to Chandler et al is directed to cellulose acetate gel beads (gel beads are different from the foregoing microparticles which have no gel components). These gel beads are made by the steps of: (a) forming, at an elevated temperature, a dispersion of a solution of at least one cellulose ester in a liquid with which the solution is immiscible; (b) cooling the dispersion; and (c) then separating the beads from the liquid. This process causes the solvent to stay in the cellulose acetate bead and prevents precipitation and hardening, and thereby forms a gel bead.

U.S. Pat. Nos 4,390,691 and 4,461,892, both to Nishikawa et al, are directed to cellulose particles made from a cellulose organic ester precursor The process includes the steps of: (a) dissolving a cellulose organic ester in a chlorinated hydrocarbon solvent to form a solution; (b) adding the solution to an agitated aqueous medium and allowing the solvent is allow to evaporate; (c) regenerating the resulting cellulose organic beads that are still in the aqueous medium to cellulose; and (d) removing the cellulose particles from the aqueous medium.

SUMMARY OF THE INVENTION

The cellulose ester microparticles disclosed hereinafter are distinct from the foregoing microparticles because of the properties, chemical and physical, imparted by their manufacturing process. This process is as follows:

(a) dissolving a cellulose ester in a liquid comprising a solvent for said cellulose ester and a non-solvent for said cellulose ester, thereby forming a dope;
(b) spheronizing the dope thereby forming fine droplets of said dope;
(c) dropping said droplets for a finite amount of time; and
(d) precipitating said droplets in a bath containing a precipitant.

The microspheres made by utilization of the processes described hereinafter have improved properties, such as controlled release of materials, separation of materials and immobilization of materials, over known microparticles.

DETAILED DESCRIPTION OF THE INVENTION

Figure 1:
FIG. 1 is the microsphere at 1500X made in Example 1.

Hereinafter, the process and microspheres made by the process are described. First, the fundamental process is described. The fundamental process is the combination of steps and conditions which are common to all the processes described hereinafter. Examples which illustrate how the process can be varied to obtain varying properties of the microspheres follows the description of the fundamental process. Second, specific variation of the process are described in greater detail. Specific examples related to these variations follow each discussion of the specific process variations where appropriate.

In general, the processes may be characterized as ways of varying the diffusion of materials to and from the microspheres at various stages along the process. It has been discovered that by varying the steps to affect the diffusion of materials to and from the microspheres enables one to obtain microspheres with differing properties.

The fundamental process for producing cellulose ester microspheres comprises the steps of:

(a) dissolving a cellulose ester in a liquid comprising a solvent for the cellulose ester and a non-solvent for the cellulose ester, thereby forming a dope;

(b) spheronizing the dope thereby forming droplets of the dope;

(c) dropping the droplets for a finite amount of time; and (d) precipitating the droplets in a precipitant.

The term "cellulose ester" means cellulose organic ester obtained by esterifying cotton linters, wood pulp or other suitable source of cellulose with a carboxylic acid having 1 to 4 carbon atoms. Exemplary cellulose esters include, but are not limited to, cellulose formate, cellulose acetate, cellulose butyrate, cellulose acetate butyrate, cellulose propionate, cellulose triacetate and mixtures thereof. Cellulose acetate is preferred.

The term "microsphere" or "microparticle" (both terms, as used therein, are synonoymous) means a particle having a diameter ranging from less than about 1 micron to a maximum of about 1,000 microns. Additionally, these microparticles are characterized as spheres as opposed to oblong or teardrop shapes.

The term "solvent for the cellulose ester" means a liquid (pure or mixture) in which the cellulose ester will readily dissolve. Such solvents include, but are not limited to, acetic acid, acetone, nitromethane, dioxane, tetrahydrofuran, pyridine, methyl ethyl ketone, DMSO, methyl acetate, halogenated hydrocarbons and mixtures thereof. The halogenated hydrocarbons include, but are not limited to, dichloromethane, chloroform, tetrachloroethane and trichloroethane. Acetic acid (alone) and a mixture of acetic acid and acetone are preferred.

The term "non-solvent for cellulose ester" means a liquid (pure or mixture) in which the cellulose ester will not dissolve. Such non-solvents include, but are not limited to, water, glycerine, toluene, formamide, lower alcohols and mixtures thereof. Lower alcohols include, but are limited to, methanol and ethanol Water is preferred.

The term "spheronizing" means any method of forming fine droplets from a liquid Such methods include, but are not limited to, aerosol spraying, airless spraying, ultrasonic spraying, rotating disk spraying, dripping, impinging on rotating atomizer plates, etc. Aerosol spraying is preferred.

The term "precipitating bath" or "precipitant" means a liquid (pure or mixture) in which the cellulose ester will not dissolve, but which forms a homogeneous solution, and which is miscible with the liquids used in the dope. Such precipitants include, but are not limited to, water, glycerine, toluene, formamide, lower alcohols and mixtures thereof Lower alcohols may include, but are not limited to, methanol and ethanol. Water is preferred. Additionally, solvents for cellulose esters, as described above, may also be added to the precipitant so long as the cellulose ester will precipitate in the precipitant mixture.

With specific regard to the first step of the process, i.e. "dissolving a cellulose ester in a liquid comprising a solvent for the cellulose ester and a non-solvent for the cellulose ester, thereby forming a dope", the ratio of solvent to non-solvent is important. The following ratios are exemplary. When working with cellulose acetate (degree of substitution ranging from 2.0–2.9), a liquid comprising acetic acid (solvent) and water (non-solvent) with a water content of less than 46% makes a suitable dope. Additionally, acetone (solvent) may be added so that the composition of liquid may range from about: 37 to 58% acetic acid; 9 to 45% acetone; and the balance water. When working with cellulose acetate butyrate, (17% butyryl), a liquid comprising 90% acetic acid and 10% water makes a suitable dope.

The viscosity of the dope is also an important parameter, as it affects the processing of the dope in the spheronizing and dropping steps. To control the dope's viscosity, preferably either the solids level and/or temperature of the dope may be varied, however, viscosity modifying additives may be used. If the dope is too thin, it will form good spherical droplets, however, the droplets will flatten upon impact with the precipitating bath, thereby causing the resulting microparticles to be less than an ideal spherical shape. If the dope is too thick, the dope may not readily form a suitable mist of droplets, or if the droplets do form, they will be too viscous to form spheres while dropping.

As mentioned above, the solids level of the dope affects the dope's viscosity. Solid levels of up to 14% cellulose ester have been investigated. Solid levels above 10% cellulose ester may require heating of the dope to lower viscosity. Solid levels of 6% cellulose ester appear to be a lower limit (for economic reasons) when ambient temperatures are used.

Also as mentioned above, the temperature of the dope affects the dope's viscosity. In this regard, the temperature may be controlled either before or after spheronization. Temperature control may include either heating or cooling. Temperature control is less preferred because it can strongly impact upon the diffusion of the liquid from the cellulose ester and thereby affect the characteristics of the skin of the microsphere and its pore structure.

Finally, the dope's viscosity may be controlled by the addition of known inert viscosity modifying additives. This, however, is also less preferred because it too may affect the characteristics of the resulting microspheres.

With specific regard to the second step, i.e., "spheronizing the dope thereby forming droplets of the dope", the method used to spheronize the dope is not critical so long as it makes small droplets with the desired size and shape distribution characteristics for the dope being processed. The spheronizing methods include, but are not limited to, aerosol sprayers (i.e. spray using air (an inert gas) or the like), airless sprayers, ultrasonic sprayers, droppers, rotating disks, dropping into rotating impinging surfaces, and the like. Air spraying is preferred.

Where an aerosol type sprayer device is used, a nozzle diameter from about 0.016 to about 0.1 inches is employed. Preferred aerosol spray devices include a centrally positioned nozzle, such as the air sprayers marketed by Spraying Systems Company, Bellwood, Illinois. Typical airless sprayers useful herein include conventional airless paint sprayers such as those marketed by the Wagner Company, Minneapolis, Minnesota.

With specific regard for the third step, i.e. "dropping the droplets for a finite amount of time", the finite amount of time is measured in terms of distance between the spheronizing apparatus and the surface of the precipitating bath. The finite amount of time or residence time in the drop zone (i.e., the distance between the spheronizing apparatus and the bath) is important for proper microsphere formation. At a minimum, sufficient time must be given so that the droplets can form spheres before they hit the surface of the precipitating bath. The amount of time will depend upon the drop distance, the specific cellulose ester used, the liquid used, the dope's viscosity, the temperature of the dope before spheronizing and in the drop zone, and the size of the droplets.

For example, if cellulose acetate is formed into droplets at ambient or elevated temperatures, the surface of the bath should be at least 40 inches below the spheronizing surface, otherwise oblong or teardrop shaped microparticles are formed. Preferably the distance, for cellulose acetate, should be in the range of 55 to 75 inches. Greater distances are possible, however, practical limitations reduce the range of distances. The medium through which the droplets fall is typically an inert gas, such as air or nitrogen.

The criticality of the dropping step is believed to be caused by the diffusion and evaporation of liquid from the droplets, which causes skin formation. It is this diffusion and evaporation of liquid that affects the skin's characteristics of the droplet. The skin of the droplet is a rate controlling membrane for the diffusion process that occurs in the precipitating bath. Moreover, the skin also acts as a rate controlling membrane in the microspheres' end uses.

The mechanism by which the skin is formed is believed to be as follows, however, applicants are in no way bound by this mechanism. While the droplet is falling, a higher viscosity, less fluid, cellulose ester rich layer (i.e. skin) forms at the surface as liquid evaporates from the droplet. However, very little liquid loss occurs, that is so little liquid is lost that a hard skin cannot form. Instead, the skin that forms is very soft and flowable, but it is hard enough to withstand the impact with the surface of the precipitation bath without flattening. The skin is referred to as a viscoelastic skin and is a smooth and continuous layer. The skin acts as a diffusional barrier (rate controlling membrane) which controls liquid loss from the droplet and which controls precipitant penetration into the droplet.

With specific regard for the fourth step, i.e. "precipitating the droplets in a precipitating bath", diffusion of liquid from and diffusion of precipitant into the cellulose ester microspheres are important. The precipitant may comprise the non-solvents, discussed above, as well as a mixture of solvent and non-solvents so long as the droplets will precipitate in the mixture.

The mechanism by which the microspheres are believed to precipitate is as follows, however, applicants are in no way bound by this mechanism. When the droplet hits the surface of the precipitating bath, the kinetics of liquid loss and, therefore, skin formation, are greatly changed. No longer is the skin formation controlled merely by the diffusion and evaporation of liquid from the falling droplet, but instead skin formation as well as cellulose ester precipitation, in the bath, are functions of competing diffusional processes, i.e., liquid diffusing out of and escaping from the droplet and precipitant moving to and diffusing into the droplet. The rate at which the liquid and precipitant are exchanged, (i.e., the relative diffusion rates) is controlled by the permeability of the skin, the relative solubility of the liquid, precipitant and cellulose ester, and temperature Variations of these parameters lead to widely different physical characteristics of the resulting microspheres.

The first thing that happens when the droplet contacts the bath is that the skin, formed during the drop, precipitates. If the exchange of liquid and precipitant is rapid, a solid continuous or dense layer is formed. If the exchange rate is slow, an open skin of sponge pores is formed in the microsphere surface. If the exchange rate is very rapid, a highly voided interior with large radial pores and/or a hollow core are formed (these are difficult to obtain). If the exchange rate is extremely slow, a continuous, very dense (non-porous)interior is formed and the center is often hollow. These microspheres are better described as bubbles and not as porous microspheres. The extremely slow exchange rate was obtained by using ice water as a precipitant.

Additionally, the precipitation bath may include surfactants The surfactants serve to reduce the surface tension of the precipitant, thereby preventing particle collapse of the surface of the bath. When the surfactant is employed, the amount utilized will generally range from about 0.01 to about 2% by weight of the bath, and preferably from about 0.1 to about 1% by weight. Such surfactants include, but are not limited to TWEENS ® (polyoxyalkylene derivatives of hexitol anhydride partial long chain fatty acid esters), SPANS ® (partial esters of the common fatty acids such as lauric, palmitic, stearic and oleic acids, and hexitol anhydrides, i.e., hexitanes and hexides, derived from sorbitol), and NIAPROOF ® #4 (sodium tetradecyl sulfate).

The bath may also be agitated by a stirrer or shaker. If the bath is agitated then an antifoaming agent may be used to prevent the buildup of foam on the surface of the bath. Such antifoaming agents are silicon based and include, but are not limited to, Dow Chemical's H-10, FG-10 or AF.

After the microspheres have been precipitated, they are removed from the bath and washed and dried. These steps are not as critical as the latter two steps discussed above. Removal of microspheres from the bath may be accomplished by filtration, vacuum filtration is preferred. The microspheres may be washed with copious amounts of water or an aqueous alcohol solution. Finally, the microspheres may be dried in an oven to remove any residual solvent or non-solvent.

In summary, the critical operation controlling the ultimate formation of microspheres with unique properties is the diffusion of liquid out of the droplets and the diffusion of precipitant into the droplet By further varying the solvent/non-solvent ratio in the dope, the height of the drop zone, the temperature of the dope, precipitant and in the drop zone, the composition of the precipitant bath and other parameters, discussed below, varying and unique properties of the microspheres may be obtained.

EXAMPLES

The following examples illustrate the fundamental process and the microspheres made thereby. The microspheres are described with reference to their physical properties such as 10% deformation; bulk density; surface area; dye uptake; particle size; and microsphere sphericity. The results of each of these physical properties are self evident, with the exception of dye uptake which is used as a measure of porosity or absorption The test procedure for each property is as follows:

10% Deformation—In this test the amount of mass required to produce a 10% loss in particle diameter is measured using Starrett Model #656-617 micrometer. A known mass is placed on the micrometer piston which acts compressively on the microsphere. The change in diameter is measured on the micrometer scale Increasing masses from 2 to 1000 grams are used. The average of 5 readings from a given sample are reported. A semi-log plot of deforming mass versus % loss of particle diameter is plotted. The mass which produces a 10% loss is determined by interpolation.

Bulk Density—In this test, a known mass of microspheres are placed in a graduated cylinder and inserted into a Ro-Tap bulk density tester. This apparatus taps the cylinder for a set number of taps. For microspheres, 700 taps are used. The volume at the end of 700 taps is divided into the starting mass to determine the bulk density.

Surface Area—Microsphere surface area is measured by nitrogen adsorption/desorption using the BET isotherm technique.

Dye Uptake—The microspheres are exposed to a solution of 0.6 g/1 of Telon Acid Blue 290 dye for a period of 4 hours. The mixture is agitated by means of a mechanical shaker. After 4 hours, the microspheres are removed by filtration, dried in a vacuum oven, and dissolved in acetone. The dye concentration in the solution is measured using a Horizon Model #5965-02 colorimeter.

Particle Size—Approximately 50 grams of microspheres are placed on the top of a stack of ASTM 8" sieves, ranging in size from 53 to 500 microns. This stack is placed in a mechanical shaker (Tyler Sieve Shaker, Model B) and shaken for 5 minutes. The sieves are individually weighed to determine the mass of microspheres retained on each. A fractional distribution is obtained by dividing the weight on each sieve by a the total starting weight of microspheres.

Microsphere Sphericity—Sphericity is measured by taking the ratio of the microsphere short and long diameters These are measured by using a Nikon Profile Projector, Model C6. Measurements for 30 microspheres from a given sample are averaged.

Examples 1-9, hereinafter, illustrate how variation of the solvent/non-solvent ratio in the dope and variation of the precipitating bath temperature affect such microsphere properties as deformation, bulk density, surface area, dye uptake and particle size.

EXAMPLE #1

1. Dissolved 600.0 g cellulose acetate (CA) in 2460 g acetic acid (HOAc)/273 3 g water to form stock soln.
2. Took 780 g stock soln. and mixed in 702 g HOAc/78g water. Placed in a pressurized bomb @ 40 psig nitrogen.
3. Used Spraying Systems 1/4J spray nozzle with 20 mil opening Used 5 psig nitrogen on nozzle.
4. Fed dope to nozzle @ 9.5 ml/min rate.
5. Droplets fell 60 inches through ambient air into precipitation bath containing 6.6 gallons of water, 200 g Niaproof #4 surfactant, and 3 ml Dow Chemical H-10 anti-foaming agent Bath was gently agitated with air.
6. Bath temperature ranged from 75°-78° F.
7. Microspheres recovered from precipitation liquid by vacuum filtration.
8. Washed with copious amounts of warm water and dried Microsphere properties:

Crushing strength (10% deformation)—24.1 g
Tapped bulk density—0.478 g/ml
Surface area—11.6 sq. m/g
Dye uptake—0.55 g/100g microspheres
Avg. particle size—174 microns

Examples #2-#9

Repeated basic steps as in Example #1 except that the ratio of HOAc/water in the solvent and precipitation bath temperature was varied. Microsphere properties were as follows:

| Ex. # | HOAC/water | Bath Temp. (F.) | 10% Def. (g) | Bulk Density (g/ml) | Surface Area (sq. m/g) | Dye Uptake (g/100 g) | Avg. Part. Size (mircons) |
|---|---|---|---|---|---|---|---|
| 1 | 90/10 | 75–78 | 17.6 | 0.478 | 11.6 | 0.55 | 174 |
| 2 | 90/10 | 37–47 | 27.9 | 0.652 | 2.0 | 0.08 | 167 |
| 3 | 90/10 | 50–58 | 14.4 | — | 7.0 | 0.44 | 214 |
| 4 | 90/10 | 88–109 | 9.0 | — | 17.7 | 1.26 | 391 |
| 5 | 90/10 | 122–127 | 11.9 | 0.210 | 11.7 | 1.33 | 239 |
| 6 | 82/18 | 122–125 | 11.3 | 0.201 | 16.3 | 1.33 | 261 |
| 7 | 60/40 | 73–76 | 27.3 | 0.573 | 9.0 | — | 179 |
| 8 | 60/40 | 123–124 | 20.3 | — | 28.6 | 1.51 | 294 |
| 9 | 60/40 | 144–148 | 12.9 | 0.202 | 17.0 | 1.86 | 293 |

Microsphere permeability, as measured by dye uptake, increases with increasing precipitation bath temperature and decreasing solvent in the dope.

Examples #10–13, hereinafter, illustrate how increasing the amount of solvent in the precipitation bath affect such microsphere properties as deformation, bulk density, surface area, dye uptake, and particle size.

EXAMPLE #10

1. Dissolved 144.0 g CA in 590.4 g HOAc/65.6 g water to form stock soln.
2. Took 800 g stock soln. and mixed in 720 g HOAc/80 g water. Placed in a pressurized bomb @ 40 psig nitrogen.
3. Used Spraying Systems 1/4J spray nozzle with 20 mil opening Used 5 psig nitrogen on nozzle.
4. Fed dope to nozzle @ 11 ml/min rate.
5. Droplets fell 60 inches through ambient air into precipitation bath containing 25.2 kg of water, 3.6 kg of HOAc, 200 g Niaproof #4 surfactant, and 3 ml Dow Chemical H-10 anti-foaming agent Bath was gently agitated with air.
6. Bath temperature ranged from 75-78 F.
7. Microspheres recovered from precipitation liquid by vacuum filtration.
8. Washed with copious amounts of warm water an dried.

EXAMPLES #11–#13

The steps of Example 10 were repeated except that varying amounts of HOAc were added to the precipitation bath. Microsphere properties were as follows:

| Ex. # | % HOAc in Bath | 10% Def. (g) | Bulk Density (g/ml) | Surface Area (Sgm) | Dye Uptake (g/100 g) | Avg Part. Size (Microns) |
|---|---|---|---|---|---|---|
| 1 | 0.0 | 17.6 | 0.478 | 11.6 | 0.55 | 174 |
| 10 | 12.5 | 20.7 | 0.386 | 26.0 | 1.71 | 184 |
| 11 | 20.0 | 18.7 | 0.297 | 29.7 | 2.11 | 221 |
| 12 | 30.0 | 20.8 | 0.274 | 29.8 | 2.75 | 215 |
| 13 | 40.0 | Microspheres agglomerated in the precipitation bath. | | | | |

Figure 2:
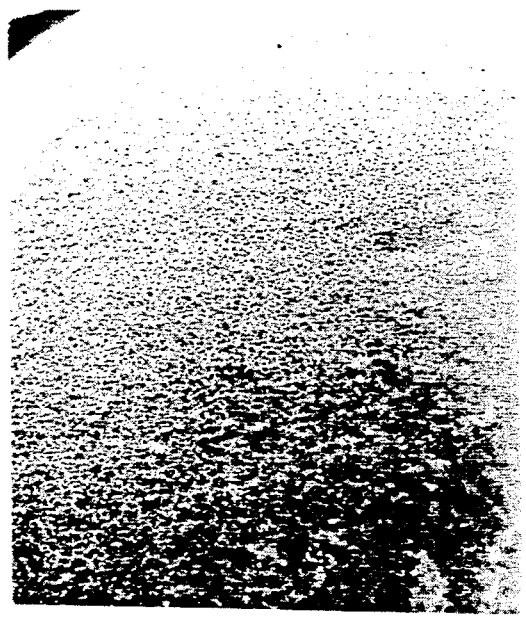
FIG. 2 is the microsphere at 1500X made in Example 11.
Figure 3:
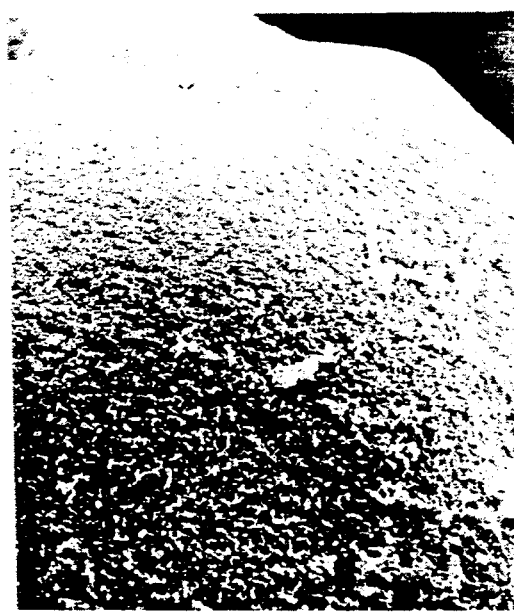
FIG. 3 is the microsphere at 1500X made in Example 12.

Addition of solvent to the precipitation bath significantly increases microsphere surface area and dye uptake values. In addition, refer to FIGS. 1–3 Microspheres from Example #1 had a dense, wrinkled skin (FIG. 1). Microspheres from Examples #11 & #12 had a generally smooth skin, covered with -0.1 micron pores (FIGS. 2 & 3).

Examples #14–19, hereinafter, illustrate how the addition of live steam to the drop zone and variation of the solvent/non-solvent ratio of the dope affect microparticle properties Also, refer to the later discussion about "microspheres with large exterior pores".

EXAMPLE #14

1. Dissolved 600.0 g CA in 2460 g HOAc/273.3 g water to form stock soln.
2. Took 780 g stock soln. and mixed in 276 g HOAc/504 g water. Placed in a pressurized bomb @ 40psig nitrogen.
3. Used Spraying Systems 1/4J spray nozzle with 20 mil opening. Used 5 psig nitrogen on nozzle. The spray nozzle was positioned in a cabinet adjacent to a fume hood.
4. Fed dope to nozzle @ 9.5 ml/min rate.
5. Droplets fell 60 inches through ambient air into precipitation bath containing 6.6 gallons of water, 200 g Niaproof #4 surfactant, and 3 ml Dow Chemical H-10 anti-foaming agent. Bath was gently agitated with air.
6. Live steam was introduced to the base of the spraying cabinet near the precipitation bath and flowed counter-currently to the dope droplets and exited the cabinet near the spray nozzle.
7. Bath temperature ranged from 124°–140 F.
8. Microspheres recovered from precipitation liquid by vacuum filtration.
9. Washed with copious amounts of warm water and dried.

Figure 4:
FIG. 4 is the microsphere at 1500X made in Example 14.
Figure 5:
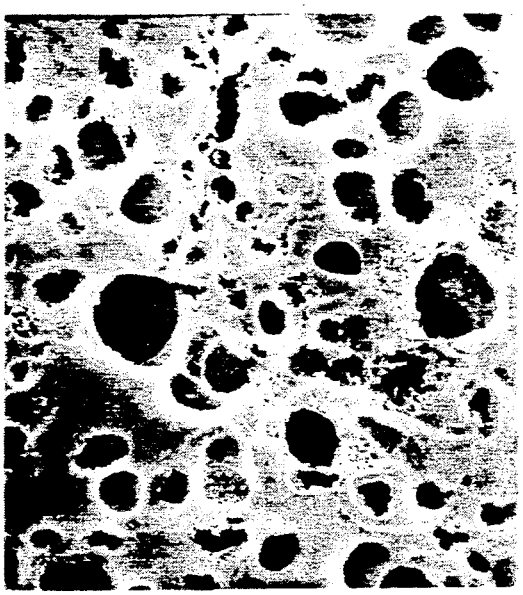
FIG. 5 is the microsphere at 1500X made in Example 15.

FIGS. 4 and 5 show the surface of the resulting microspheres. The surface has numerous 1 to 6 micron holes, revealing the microporous structure underneath.

EXAMPLES #15–#19

Figure 6:
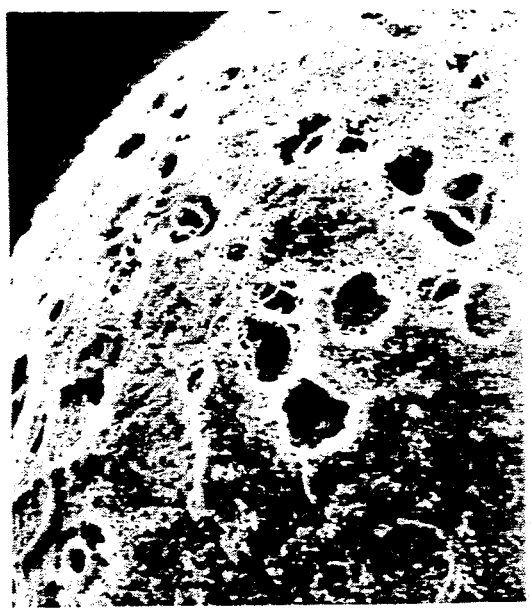
Figure 7:
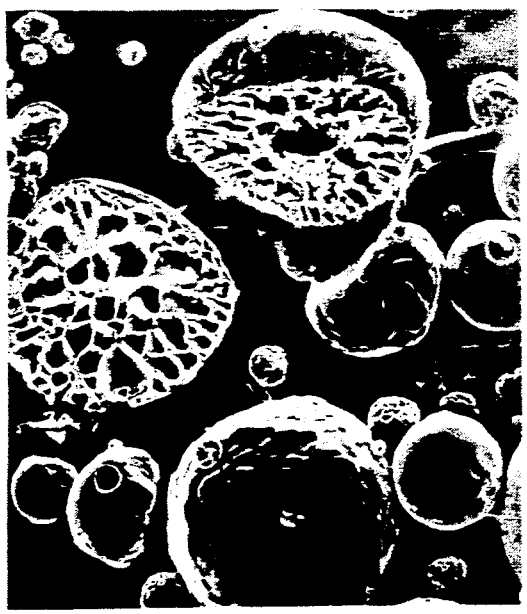
FIG. 7 is the microsphere at 150X made in Example 16.
Figure 8:
FIG. 8 is the microsphere at 1200X made in Example 17.
Figure 9:
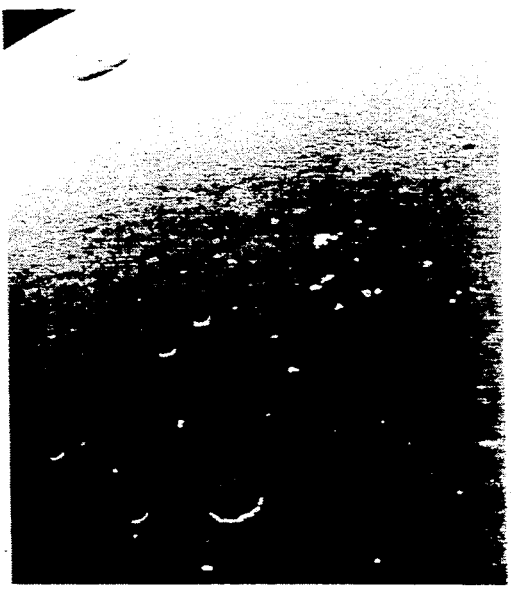
FIG. 9 is the microsphere at 1500X made in Example 18.
Figure 10:
FIG. 10 is the microsphere at 1500X made in Example 19.

The steps of Example #14 were repeated, except that varying amounts of HOAc and water were used in the dope solvent. The following solvent levels were used:

| Example # | HOAc/water in dope solvent |
|---|---|
| 15 | 56/44 - FIG. 6 |
| 16 | 65/35 - FIG. 7 |
| 17 | 75/25 - FIG. 8 |
| 18 | 90/10 - FIG. 9 |
| 19 | 100/0 - FIG. 10 |

Comparing the microspheres obtained from these Examples as shown in FIGS. 6–10, along with FIGS. 4 and 5 show the impact the dope solvent/non-solvent ratio has on the surface of microspheres generated in the presence of steam.

Examples #20–21 illustrate composite microparticles. Also refers to the later discussion about "composite microspheres".

EXAMPLE #20

1. Dissolved 128.0 g CA in 817.6 g HOAc/213.0 g water and 350 g silica gel (Mallinckrodt Type 60 A Special, 7–15 microns) to form stock soln.
2. Took stock soln. and mixed in 175.6 g HOAc/458.1 g water. Placed in a pressurized bomb @ 40 psig nitrogen.
3. Used Spraying Systems 1/4J spray nozzle with 28 mil opening. Used 5 psig nitrogen on nozzle.
4. Fed dope to nozzle @ 11 ml/min rate.
5. Droplets fell 65 inches through ambient air into precipitation bath containing 28.2 liters of water, 70.6 gTween 80 surfactant, 7 ml Polyglycol P-1200 (Dow Chemical) and 2 drops Dow Chemical H-10 anti-foaming agent. Bath was gently agitated with air.
6. Bath temperature ranged from 130°–146° F.
7. Microspheres recovered from precipitation liquid by vacuum filtration.
8. Washed with copious amounts of warm water an dried. These microspheres had a surface area of 190 sq. m/g.

EXAMPLE #21

1. Dissolved 100.0 g CA in 1260 g HOAc/313 g water and 300 g activated carbon (Anderson AX-21, ground to an average particle size of 1 micron) to form a stock soln.
2. Took stock soln. and mixed in 525 g water. Placed in a pressurized bomb @ 40 psig nitrogen.
3. Used Spraying Systems 1/4J spray nozzle with 20 mil opening. Used 5 psig nitrogen on nozzle.

4. Fed dope to nozzle @ 11 ml/min rate.

5. Droplets fell 40 inches through ambient air into precipitation bath containing 20.3 liters of water, 7.4 liters of HOAC, 70 g Tween 80 surfactant, and 0.4 g Dow Corning AI anti-foaming agent. Bath was gently agitated with air.

6. Bath temperature ranged from 122°-126° F.

7. Microspheres recovered from precipitation liquid by vacuum filtration.

8. Washed with copious amounts of warm water and dried.

Figure 11:
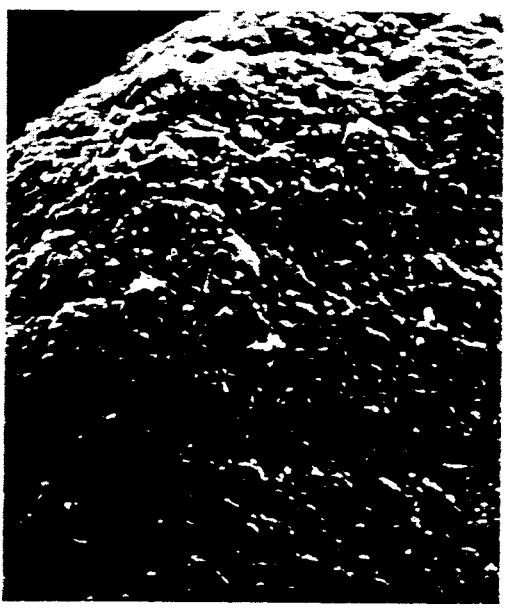
FIG. 11 is the microsphere at 1500X made in Example 21.
Figure 12:
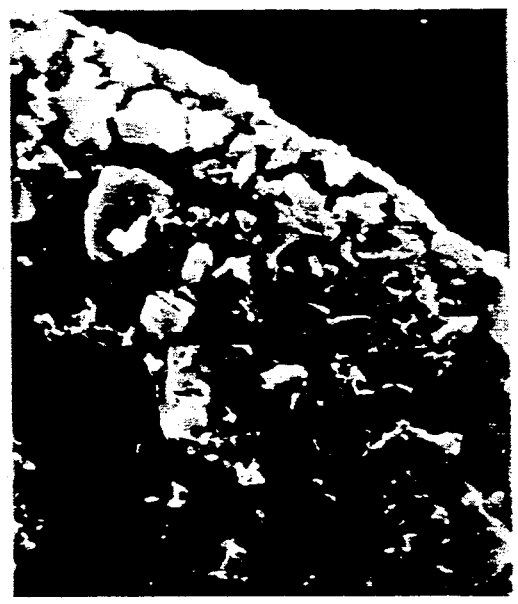
FIG. 12 is the interior of the microsphere at 3000X made in Example 21.

See FIGS. 11 and 12 for SEM's of these microspheres. These microspheres had a surface area of 620 sq. m/g.

Example #22 illustrates the affect of solvent/non-solvent ratio on the surface texture of microparticles. Also, refer to the later discussion on the "surface texture of microparticles".

EXAMPLE #22

Figure 13:
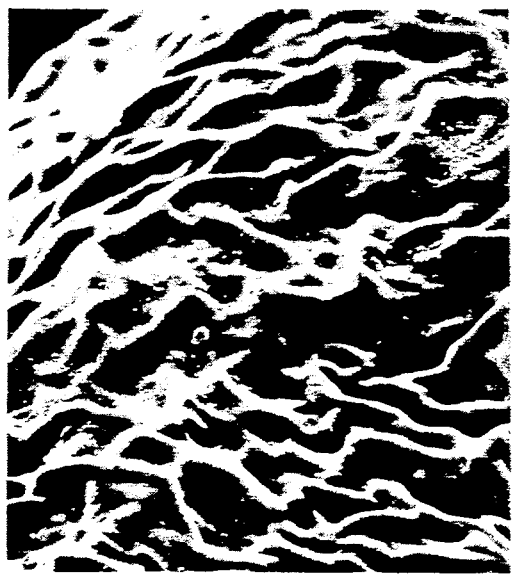
FIG. 13 is one of the microspheres at 1500X made in Example 22.
Figure 14:
FIG. 14 is one of the microspheres at 1500X made in Example 22.
Figure 15:
FIG. 15 is one of the microspheres at 1500X made in Example 22.
Figure 16:
FIG. 16 is one of the microspheres at 1500X made in Example 22.
Figure 17:
FIG. 17 is one of the microspheres at 1500X made in Example 22.
Figure 18:
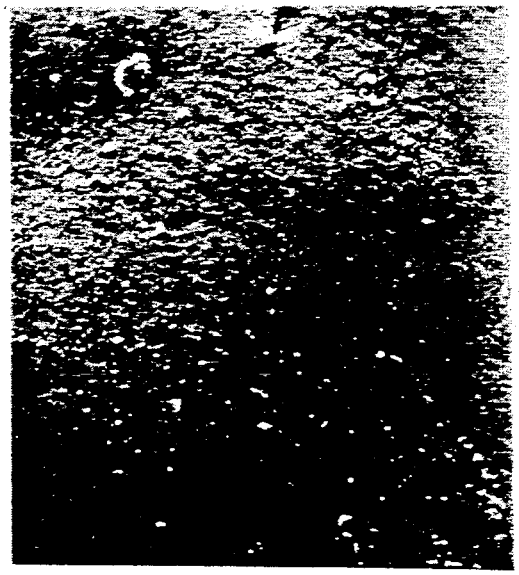
FIG. 18 is one of the microspheres at 1500X made in Example 22.

A 9% by wt. solution of cellulose acetate was dissolved in solutions of acetic acid and water ranging from 54% to 99.7% HOAc. Microspheres were prepared by the process as described in Example #1. SEM's (scanning electron micrographs) of the microsphere surface indicates a range of surface textures ranging from highly wrinkled to smooth depending upon HOAc concentration in the dope. High levels of HOAc result in a wrinkled surface, lower levels result in a smooth surface. Refer to the following figures with the corresponding dope solvent concentration:

FIG. 13—99.7% HOAc
FIG. 14—90.0% HOAc
FIG. 15—80.0% HOAc
FIG. 16—70.0% HOAc
FIG. 17—65.0% HOAc
FIG. 18—54.0% HOAc

The transition from a wrinkled to a smooth surface occurs at around 70% HOAc in the dope solvent.

Example #23 illustrates the formation of cellulose ester microparticle with an ester other than cellulose acetate.

EXAMPLE #23

1. Dissolved 144.0 g cellulose acetate butyrate (Eastman, 17% butyryl content) in 590.4 g HOAc/65.6 g water to form stock soln.

2. Took stock soln. and mixed in 720 g HOAc/80 g water. Placed in a pressurized bomb @ 40 psig nitrogen.

3. Used Spraying Systems 1/4J spray nozzle with 20 mil opening. Used 5 psig nitrogen on nozzle.

4. Fed dope to nozzle @ 11 ml/min rate.

5. Droplets fell 59.2 inches through ambient air into precipitation bath containing 27.9 liters of water, 200 g Niaproof #4 surfactant, and 0.4 g Dow Corning AF anti-foaming agent. Bath was gently agitated with air.

6. Bath temperature ranged from 72-77 F.

7. Microspheres recovered from precipitation liquid by vacuum filtration.

8. Washed with copious amounts of warm water and dried.

Microsphere properties: Crushing strength (10% deformation)—7.3 g Tapped bulk density—0.137 g/ml Surface area—40.0 sq. m/g Dye uptake—0.98 g/100 g microspheres Avg. particle size—268 microns.

Example #24 illustrates the affect of varying drop zone distances on the shape of microspheres.

EXAMPLE #24

1. Dissolved 600.0 g CA in 2460 g HOAc/273 3 g water to form stock soln.

2. Took 780 g stock soln. and mixed in 702 g HOAc/78 g water. Placed in a pressurized bomb @ 40 psig nitrogen.

3. Used Spraying Systems 1/4J spray nozzle with 20 mil opening. Used 5 psig nitrogen on nozzle.

4. Fed dope to nozzle @ 9.5 ml/min rate.

5. Droplets fell 60 inches through ambient air into precipitation bath containing 6.6 gallons of water, 200 g Niaproof #4 surfactant, and 3 ml Dow Chemical H-10 anti-foaming agent. Bath was gently agitated with air.

6. Bath temperature ranged from 70-72 F.

7. Microspheres recovered from precipitation liquid by vacuum filtration.

8. Washed with copious amounts of warm water an dried.

Steps 5 thru 8 were repeated at drop heights of 40, 30, 15, and 5 inches. Microsphere sphericity was measured using a Nikon Profile Projector at 50X. Sphericity was defined as the ratio of the microsphere short diameter to long diameter, measured for 30 random microspheres of a given sample. Results were as follows:

| Drop Height (inches) | Sphericity |
| --- | --- |
| 60 | 0.918 |
| 40 | 0.912 |
| 30 | 0.800 |
| 15 | 0.664 |
| 5 | No microspheres formed |

From this data, sphericity is shown to drop below 0.9 at a drop height just below 40 inches.

Example #25 illustrates the plasma treatment by which the skin of microparticles may be removed.

EXAMPLE #25

Figure 19:
FIG. 19 shows a microsphere which has not been treated with plasma (Example 25).
Figure 20:
FIG. 20 shows a microsphere which has been treated with plasma (Example 25).

Microspheres were prepared similarly to the process described in Example #1. A sample of these microspheres was exposed to an oxygen plasma under the following conditions:

Sample I—10% oxygen, 50 watts RF power, 0.1 Torr, 5 minutes
Sample II—10% oxygen, 100 watts RF power, 0.1 Torr, 5 minutes FIGS. 19 and 20 show the surface of microspheres treated and untreated with the plasma. The plasma removed the dense skin on the surface of the microsphere, exposing the porous sub-structure.

Example #26 illustrates the use of an alternate spheronizing apparatus.

EXAMPLE #26

A dope of cellulose acetate at 9% by weight was prepared using a mixture of 90% HOAc/10% water to dissolve the CA. This dope was placed in a pressurized bomb at 45 psig nitrogen. The dope was fed to a metering pump and pumped at a rate of 17 g/min. This dope was pumped to a spinning Teflon disk. This disk had 16 mil holes in the periphery. The disk was spun using an air driven motor at rates of 900 and 1500 rpm. The dope droplets formed fell 48 inches into a precipitation bath containing water and surfactant. The resulting microspheres were recovered from the bath, washed and dried.

Example #27 illustrates how dope may be heated before spheronization.

EXAMPLE #27

1. Dissolved 448.0 g CA in 1036.8 g HOAc/115.2 g water to form stock soln.
2. Took 800 g stock soln. and mixed in 307.2 g HOAc/492.8 g water to form a dope containing 14% by weight CA. Placed in a pressurized bomb @ 50 psig nitrogen.
3. Used Spraying Systems 1/4J spray nozzle with 20 mil opening. Used 5 psig nitrogen on nozzle.
4. Fed dope to nozzle @ 6.5 ml/min rate. Before reaching the nozzle, the dope was passed through a jacketed pipe with steam on the jacket to heat the dope. The dope temperature ranged from 82 to 88 C.
5. Droplets fell 60 inches through ambient air into precipitation bath containing 6.6 gallons of water, 72 g Tween 80 surfactant, and 3 ml Dow Corning FG-10 anti-foaming agent. Bath was gently agitated with air.
6. Bath temperature ranged from 117 to 127 F.
7. Microspheres recovered from precipitation liquid by vacuum filtration.
8. Washed with copious amounts of warm water and dried.

Microsphere properties: Crushing strength (10% deformation)—12.3 g Tapped bulk density - 0.238 g/ml Surface area—16.0 sq. m/g Dye uptake—2.18 g/100 g microspheres.

Four different cellulose ester microspheres will be discussed hereinafter. These microspheres are: (1) porous microspheres; (2) microspheres with large exterior surface pores; (3) composite microspheres; and (4) microspheres with various surface textures.

Porous microspheres are characterized as having: a continuous outer surface with no or very few surface openings; a permeable surface (permeable means at the molecular level); and an interior structure with several large pores or channels with microporous spongy walls. These porous microspheres have utility in a wide variety of application in which the controlled release or uptake of chemicals is desired. Exemplary end uses include the controlled release or uptake of chemicals such as pharmaceuticals, agriculturals, flavorings, dyes and fragrances; catalyst carriers; enzyme or other biological immobilizers; filter packing; chromatographic packings; and specialty filters.

The process by which these microspheres are made shall be explained by highlighting the modifications to the foregoing fundamental process. In the dope, the concentration of the cellulose esters is close to the incipient precipitation point. Incipient precipitation point means that the dope, at a given constant temperature, is so saturated with cellulose ester that if more cellulose ester is added or the concentration of solvent is reduced, then the cellulose ester will begin to precipitate out of the solution. Being "close" to the incipient precipitation point ranges from the dope concentration being exactly at the precipitation point to the solvent/non-solvent mixture having from about 10 to about 20% by weight more solvent present than the amount of solvent present at the precipitation point This is important so that sufficiently rapid precipitation occurs in the precipitation bath.

The incipient precipitation point, however, varies from each particular ester and solvent or solvent/non-solvent system. It is within the knowledge of one skilled in the art to determine the proportions and combination of solvent and non-solvent necessary to mix together so as to obtain the dope concentration close to the incipient precipitation point while maintaining the viscosity of the dope suitable for droplet formation. For example, if a dope of 9% by weight cellulose acetate having a degree of substitution of 2.41 with an acetic acid/water mixture is employed, the ratio of the solvent and non-solvent should be maintained between 55/45 to 70/30 so as to be close to the incipient precipitation point of the cellulose acetate which occurs in the mixture of about 55% acetic acid and 45% water, and at the same time maintaining a dope viscosity such that the desired droplets can be formed.

The precipitation bath temperature is maintained at an elevated temperature such that the precipitant is not boiling but the temperature is sufficiently high so that precipitation occurs rapidly. For example, if the ester is cellulose acetate, water is a suitable precipitant and its temperature is maintained at least above 115° F. and preferably between 120° to about 145° F.

The resulting pore structure along with the high permeability of the exterior skin results in a cellulose ester microsphere which has superior mass transfer properties as compared to microspheres known in the art. Exemplary tests demonstrate that this includes surface area and dye uptake values of the microparticle. The microparticle having such an exterior and interior structure has a surface area of at least 16 sq m/g and preferably greater than 20 sq m/g and a dye uptake of at least 1.4 g of dye/100 g of microparticle, and preferably greater than 1.5 g of dye/100g of microparticle.

EXAMPLE 28

780g of a dope stock solution of 60% acetic acid/40% water solution containing 18% solid cellulose acetate having a degree of substitution of 2.41 was added to 780g of a 60% acetic acid/40% water solution to form the dope solvent mixture The dope solvent mixture was then metered by a gear pump through a Spraying Systems Company aerosol nozzle at 9.5 ml/min. Nitrogen gas at 4 psig was employed to break up the dope stream exiting the nozzle so as to form fine droplets.

The fine droplets were allowed to drop 60 inches to an agitated precipitation bath. The precipitation bath comprised 28.2 ml of water, 200 mg of Niaproof® #4 surfactant and 3 ml of H-10 Dow Chemical antifoaming agent, and was maintained at a temperature of from 122.5° F. to 123.5° F. The resulting precipitated microparticles were filtered and washed with water and dried in a vacuum drying oven at 122° F.

EXAMPLES 29–33

Following procedures similar to that of Example 28, other samples, Examples 29–33, were made for comparison to Example 28. A series of experiments was then performed on each example to test the effect on mass transfer properties that the solvent mixture and bath temperature have thereon. These tests particularly include the measurement of surface area and dye uptake. Surface area was measured by nitrogen adsorption/-desorption utilizing the BET isotherm technique. Dye uptake was measured by exposing the microparticles to a Telon Acid Blue 290 dye with agitation for a period of four hours. After four hours the microparticles were removed by filtration, dried and dissolved in acetone The concentration of the dye was then measured colormetrically. The results are summarized in Table A.

TABLE A

| Example No. | Solvent Mixture Acetic Acid/ % H2O | Bath Temperature °F. | Surface Area sqm/g | Dye Uptake g Dye/100 g |
| --- | --- | --- | --- | --- |
| 28 | 60/40 | 122-124 | 28.6 | 1.51 |
| 29 | 60/40 | 144-148 | 17.0 | 1.86 |
| 30 | 60/40 | 73-76 | 10.0 | 0.22 |
| 31 | 90/10 | 75-78 | 11.0 | 0.55 |
| 32 | 90/10 | 122-127 | 11.7 | 1.33 |
| 33 | 82/18 | 122-125 | 16.3 | 1.33 |

Microspheres with large exterior pores are characterized by: a plurality of relatively large pores on the surface, these pores having diameters ranging from about 0.1 to about 6.0 microns and covering between about 1 to about 10% of the microsphere's surface; and a cellular interior. The pores, therefore, establish direct communication between the exterior environment and the cellular interior structure. The microspheres have utility similar to the foregoing porous microspheres except the microspheres with large exterior pores are able to capture or release molecules or particles with greater size.

The process by which the microspheres with large exterior pores are made shall be explained by highlighting the modifications to the foregoing fundamental process. As with microspheres, the dope is prepared so that the concentration of cellulose ester is close to the incipient precipitation point (see the foregoing discussion of incipient precipitation point). In the drop zone, the atmosphere containing, and preferably saturated with, a vapor of a non-solvent for cellulose ester. The non-solvent vapor atmosphere, in the particular case of cellulose acetate, is preferably formed by introducing steam, i.e. at 15 psig and 230° F. Of course other non-solvent vapors may be used.

Although the reasons why the contact of the droplet with a non-solvent vapor will result in open surface pores upon precipitation are not fully understood, it is believed that the non-solvent vapor causes rapid pre-precipitation of the ester at the exterior surface of the droplet. The resulting droplets have "open end" surface pores, that will not close during precipitation. The rapid pre-precipitation at the droplet surface does not allow sufficient time for the pore openings on the surface to close upon immersion in the precipitation bath.

EXAMPLE 34

A dope solution consisting of 9% by weight cellulose acetate and the remainder being a 60%/40% by weight mixture of acetic acid and water is metered by a gear pump through an aerosol nozzle of 0.02 inches inside diameter Nitrogen at 4 psig is concurrently fed into the nozzle to cause the existing dope stream to break up into discrete droplets. The nozzle was positioned at a height of about 60 inches above the precipitation bath to thereby establish a drop zone between the nozzle and the precipitation bath.

The precipitation bath contained water as the non-solvent liquid, about 0.7% by weight of an anionic surfactant (i.e. Niaproof #4), and about 0.01% by weight of an antifoaming agent (i.e. Dow H-10). Agitation of the liquid in the precipitation bath was accomplished by the direct sparging of air into the bath liquid. The nozzle and precipitation bath were enclosed within a cabinet having suitable ventilation to permit removal of volatilized solvent for the cellulose acetate. Live steam (14.7 psig at 230° F.) was introduced into the cabinet at the level of the precipitation bath and at a rate to totally fill the cabinet so as to establish a saturated atmosphere of non-solvent vapor through which the droplets pass on their way to the precipitation bath.

EXAMPLES 35-39

Following procedures similar to that of Example 34, other samples, Examples 35-39 were made for comparison to Example 34. A series of experiments and micrographs were done on each example to test the effect on the mass transfer properties and the presence of open surface pores that the use of a non-solvent vapor had thereon.

These tests particularly include the measurement of surface area and dye uptake. Surface area was measured by nitrogen adsorption/ desorption utilizing the BET isotherm technique. Dye uptake was measured by exposing the microparticles to a Telon Acid Blue 290 dye with agitation for a period of four hours. After four hours the microparticles were removed by filtration, dried and dissolved in acetone. The concentration of the dye was then measured colometrically. The results are summarized in Table B.

TABLE B

| Example No. | % Acetic Acid H2O | Steam Present | Surface Area (sq m/g) | Dye Uptake g Dye/100 g Microparticles | Exterior Pores |
| --- | --- | --- | --- | --- | --- |
| 34 | 60/40 | Yes | 21.0 | 2.41 | Yes |
| 35 | 56/44 | Yes | 23.0 | 1.41 | Yes |
| 36 | 65/35 | Yes | 24.0 | 1.21 | Some |
| 37 | 90/10 | Yes | 28.0 | 1.18 | No |
| 38 | 100/0 | Yes | 15.0 | 1.21 | No |
| 39 | 60/40 | No | 28.6 | 1.51 | No |

As is readily apparent a microparticle produced by practice of the present invention, namely Examples 34-36, results in a product having high surface area and dye uptake values as comparable to micropraticles formed without the use of a non-solvent vapor in the pre-precipitation step namely Examples 37 and 38. When the ratio is greater than about 80/20, there are not open exterior surface pores present.

In addition to the foregoing, the pore size and frequency of pore occurrence may be controlled by "pore forming agents" which are added to the dope. Pore forming agents modify the diffusional characteristics of the droplet during the dropping and precipitating steps. Such pore forming agents may be characterized as large soluble molecules which are designed to dissolve out of the microsphere and leave a pore behind roughly the size of the molecule Known plasticizers used with cellulose esters may be used. Exemplary pore forming agents include, but are not limited to, polyethylene glycol (Carbowax) at about 0.1-0.5% (by weight of cellulose acetate; triacetin at 5-25%, dimethyl phthalate at 10-25%; ethylene diacetate 10-25%, sorbitol at 10% and magnesium sulfate at up to 5%.

Composite microspheres are characterized by a microporous matrix of a cellulose ester and a finely divided, inert particulate solids homogeneously distributed throughout the microporous matrix. The particulate solids include, but are not limited to, silica gel, aluminum silicate, magnesium silicate, activated carbon, carbon black, titanium dioxide, pharmaceuticals and herbicides. These solids can be loaded with such things as flavorants or flagrances (e.g. citral, amethde, ethylbutyrate) and thereafter be used in cigarette filters, for example. The composite microspheres, if loaded with activated carbon, for example, could be used in hemoperfusion to absorb toxic chemicals in the blood. Additional solids include, but are not limited to, ibuprofen, theophylline, phenylpropanolamine hydrochloride, Selectone, Cotoran, Sencor DF and Sencor WF.

The process by which composite microspheres are made shall be explained by highlighting the modifications to the foregoing fundamental process. After the dope is made, the finely divided particulate solid is homogeneously dispersed into the dope in an amount ranging from about 0.1 to about 20% by weight of the dope. The upper limit of this range is dependent on the specific cellulose ester/solid/solvent/non-solvent system employed and the spheronization apparatus. The liquid component of the dope may range from about 45 to about 100% by weight of the dope. The composite microspheres resulting therefrom can have particulate solid levels approaching 100% of the total weight of the microsphere. The solid levels typically range from about 0.1 to about 85% by weight of the microsphere. The particulate solids are embedded throughout the microsphere and are interconnected, when not physically touching, by a network of communicating micropores extending throughout the microsphere. Alternatively, composite microspheres can be made by producing porous microspheres, then soaking those microspheres in a liquid. The liquid not only includes a pure liquid, but it also includes liquid with dissolved solids (e.g. salt water) and melts of solids. With regard to liquids with dissolved solids, the liquid may be subsequently flashed off leaving only the solid. The microspheres absorb the liquid which can be released later.

It may be advantageous to maintain the precipitation bath at an elevated temperature For example, when using carbon black, the temperature was about 224.F. When using silica gel, the bath was about 130° F.; and when using titanium dioxide the bath temperature was about 95° F. Additionally, when using carbon black, the precipitation bath may comprise a water/acetic acid mixture (5.4 gallons of water to about 2 grams acetic acid).

EXAMPLE 40

CARBON BLACK COMPOSITE MICROPARTICLE 1975 g of a dope stock solution was prepared containing 100 g of cellulose acetate having a degree of substitution of 2.41, 300 g of carbon black 1260 g of acetic acid and 315 g of water. This was blended until the cellulose acetate was dissolved and the carbon black homogeneously dispersed. To this 525 g of water was added to achieve the final dope mixture. The dispersion was then metered by a gear pump through an aerosol nozzle. Nitrogen gas at 5 psig was employed to break up the dope stream exit the nozzle so as to form fine droplets.

The fine droplets were allowed to drop 40 inches to an agitated precipitation bath. The precipitation bath comprised 5.4 gallons of Dow Corning AF antifoaming agent, and was maintained at a temperature of about 124° F. The resulting microparticles were filtered and washed with water and dried in a drying oven at 125°. There were no signs of any leaching of the carbon. The solid level in the microparticle was about 75% carbon by weight of the total weight of the microparticle.

EXAMPLE 41

SILICA GEL COMPOSITE MICROPARTICLE 675.4 g of a cope stock solution was prepared containing 128 g of cellulose acetate having a degree of substitution of 2.41, 964 g of water and 451 g of acetic acid. To this solution was added 607.6 g of a silica gel/water dispersion containing 31.6% by weight silica gel and 317 g acetic acid. This mixture was blended until the silica gel particles were homogeneously dispersed. The dispersion was then metered by a gear pump through an aerosol nozzle. Nitrogen gas at 5 psig was employed to break up the dope stream exiting the nozzle so as to form fine droplets.

The fine droplets were allowed to drop 59 inches to an agitated precipitation bath. The precipitation bath comprised 7.6 gallons of water, 200 g of Niaproof ® #4 surfactant and 3 ml of Dow Corning H-10 antifoaming agent and was maintained at a temperature of about 130° F. The resulting microparticles were filtered and washed with water and dried in a drying oven at 122° F. The solid level in the microparticle was about 60% silica by weight of the total weight of the microparticles. There were no signs of any leaching of the silica gel.

EXAMPLE 42

TITANIUM DIOXIDE COMPOSITE MICROPARTICLE 230 g of a dope stock solution containing 18% solid cellulose acetate having a degree of substitution of 2.41 was added to 230 g of a 50% acetic acid/50% water solution to form the dope solvent mixture. 13.8 g of titanium dioxide in powder form was blended and homogeneously dispersed into the dope solvent mixture to form a dope/solid dispersion. The dispersion was then metered by a gear pump through an aerosol nozzle. Nitrogen gas at 5 psig was employed to break up the dope stream exiting the nozzle so as to from fine droplets.

The fine droplets were allowed to drop 72 inches to an agitated precipitation bath. The precipitation bath comprised 9 gallons of water and 200 g of Niaproof ® #4 surfactant and was maintained at a temperature of about 95° F. The resulting microparticles were filtered and washed with water and dried in a drying oven at 122° F. The solid level in the microparticle was about 25% titanium dioxide by weight of the total weight of the microparticle. There were no signs of any leaching of the titanium dioxide.

The surface texture of cellulose ester microspheres can range from smooth to highly wrinkled. Highly wrinkled microspheres are particularly useful in biotechnology applications where enzyme or cell immobilization is important. Highly wrinkled microspheres not only provide increased surface area for a greater number of anchoring cites, but also have furrows that provide a protective environment for cells which are shear sensitive. Wrinkled microspheres have up to 5 times the exterior surface area of smooth surface microspheres of equal diameter.

The process by which the surface texture of the microsphere is controlled will be explained with regard to the modifications to the fundamental process. The degree of wrinkle in the surface of the microsphere is a function of the ratio of solvent to non-solvent. As the solvent content decreases from a maximum to about 100% to about 54%, the degree of wrinkle also decreases. The transition appears to occur at about 70% solvent.

Finally, as skinless cellulose ester microspheres can be made by exposing microspheres to an oxygen plasma. Cellulose microspheres may be made by regenerating cellulose ester microspheres, by treating the cellulose ester microsphere with a de-esterfying agent, e.g. a base, at or after precipitation.

The following applications are incorporated herein by reference: Ser. No. 07/077,274 filed July 24, 1987; Ser. No. 07/077,275 filed July 24, 1987; Ser. No. 07/281,587 filed Dec. 9, 1988; Ser. No. 07/088,914 filed Aug. 24, 1987; and Ser. No. 07/168,799 filed Mar. 16, 1988.

The present invention may be embodied in other specific forms without departing from the spirit or essential attributes thereof and, accordingly, reference should be made to the appended claims, rather than to the foregoing specification, as indicating the scope of the invention.

What is claimed is:

1. A spherical porous microparticle of a cellulose organic ester characterized by having a plurality of exterior surface pores having diameters of between about 1.0 to about 6.0 microns and being present in an amount of between about 1% to about 10% of the exterior surface thereof.

2. A spherical porous microparticle of a cellulose organic ester according to claim 1 wherein the microparticle has particle size of no more than 1,000 microns and a dye uptake of at least about 2.0 grams of dye per 100 grams of the spherical microparticles.

* * * * *